May 10, 1955

M. HETZEL 2,707,875

DEVICE FOR AUTOMATICALLY CALIBRATING THE FREQUENCY OF
THE VIBRATIONS OF A REGULATING DEVICE OF A CLOCKWORK

Filed March 13, 1953

Inventor
Max Hetzel by Karl Michaelis, Atty.

May 10, 1955 M. HETZEL 2,707,875
DEVICE FOR AUTOMATICALLY CALIBRATING THE FREQUENCY OF
THE VIBRATIONS OF A REGULATING DEVICE OF A CLOCKWORK
Filed March 13, 1953 3 Sheets-Sheet 2
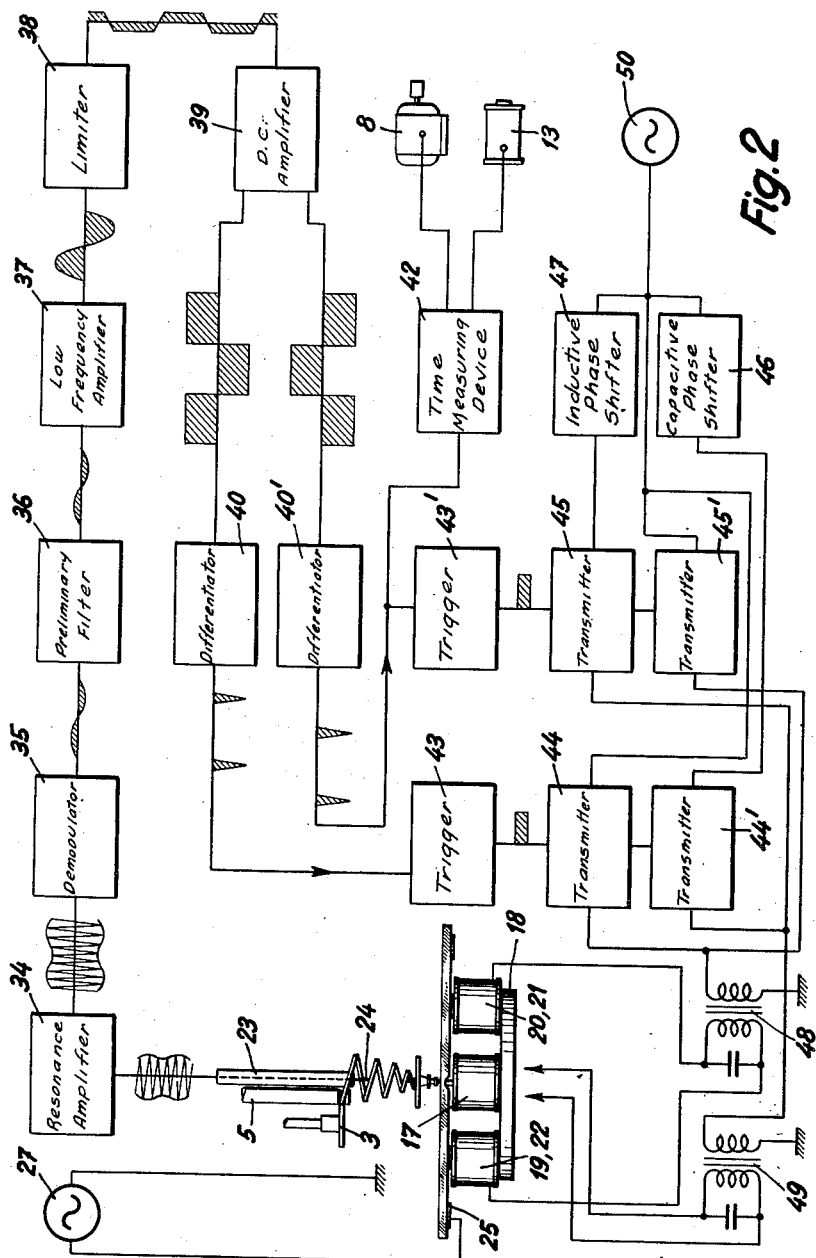

United States Patent Office 2,707,875
Patented May 10, 1955

2,707,875

DEVICE FOR AUTOMATICALLY CALIBRATING THE FREQUENCY OF THE VIBRATIONS OF A REGULATING DEVICE OF A CLOCKWORK

Max Hetzel, Bienne, Switzerland, assignor to Bulova Watch Company Inc., New York, Bienne Branch, Bienne, Switzerland, a joint-stock company Application March 13, 1953, Serial No. 342,106

Claims priority, application Switzerland April 9, 1952

3 Claims. (Cl. 73—6)

This invention relates to timepieces and more especially to devices serving for the calibration and regulation of the regulating device.

It is an object of this invention to provide means for rendering the process of calibration and regulation of the regulating device automatic in order to obtain more accurate and uniform results and to cut out partly or altogether the manual work hitherto required for the purpose.

Obviously the regulating device of a timepiece must be subjected to a first coarse calibration before it is assembled. This coarse calibration comprises the cutting of the hair spring approximately to the correct length and this operation must be so accurate that any inaccuracies connected therewith can be easily corrected in the assembled timepiece.

As a rule this calibration is carried out in such a way that the regulating device is suspended by means of the free end of the hair spring and subjected to torsional vibrations. The frequency of these torsional vibrations is compared with the calibrating oscillation by means of an indicating device, for instance a cathode ray tube, and the spring is cut as soon as the frequency to be calibrated coincides with the calibrating frequency. The length of the spring is adjusted manually and the vibrations of the regulating device are increased in amplitude by hand.

This known manual calibrating process involves the drawback that a person can operate only a single calibrating device. It is therefore important that the calibration operation be carried out automatically by providing an apparatus, in which the once inserted regulating device is automatically subjected to vibrations, while its spring is automatically lengthened or shortened, according to whether the regulating frequency is too high or too low, the spring being automatically cut, when its length is correct.

In such apparatuses it is imperative that the inserted regulating device be automatically subjected to vibrations and that these vibrations be maintained until the calibration has been carried out.

In the described and known apparatuses the regulating device suspended by means of the hair spring carries out apart from the torsional vibration to be calibrated a synchronous vertical vibration of equal frequency, the lower end of the axis of the balance hitting against a flat support every time when the regulating device is in the turning position of its vibration. At each hit an electrical impulse is derived by electro-acoustical or electrical means, the impulse during the calibration serving as a comparison quantity with the vibration to be calibrated.

If now, in order to render automatic the calibration of the regulating device, the latter is to be automatically driven in the mentioned manner, this is hardly possible if the regulating device carries out a vertical vibration. The apparatus according to this invention avoids this vertical vibration in the simplest possible manner.

The invention consists in an apparatus for automatically calibrating the frequency of a regulating device intended for a clockwork, in which the regulating device can be suspended by the hair spring above a flat support so as to be freely oscillating, the free end of the balance staff abutting against the flat support. This apparatus is characterized by a magnet system arranged underneath the support and having a magnetic field extending above the support, the magnetic field having an axis of symmetry coinciding with the axis of the regulatitng device suspended in the apparatus.

In the drawings affixed to this specification and forming part thereof an embodiment of an apparatus according to this invention is illustrated diagrammatically by way of example.

In the drawings:

Fig. 2 is a block diagram of the entire apparatus serving for driving the regulating device;

Figure 1:
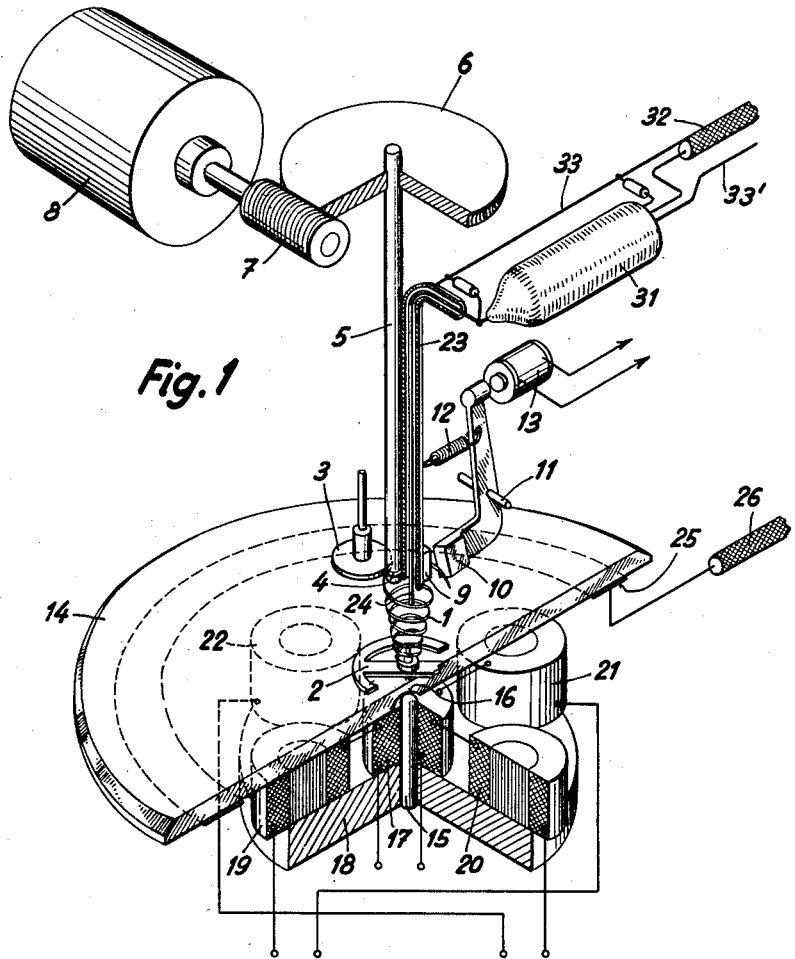
Fig. 1 is a perspective view of the calibrating apparatus with the regulating device inserted therein.

Referring to the drawings and first to Fig. 1, 1 is the hair spring and 2 the balance. The free end of the hair spring 1 projects between two rollers 3 and 4 pressed against each other by a spring (not shown). The roller 3 can be turned away from the roller 4 against the action of this spring in order to insert the hair spring between them. The roller 4 is arranged at the lower end of a shaft 6 which carries at its upper end a worm wheel 6 which is in engagement with a worm 7 mounted on the shaft of a servomotor 8 which is reversible so as to be rotatable in both directions. The free end of the hair spring 1 is led through between the blades 9 and 10 of a shears. The blade 10 is designed as part of a two-armed lever which is rotatable about the pivot 11 and is normally held in the position shown in the drawing by means of a spring 12. In order to cut the hair spring 1, a cutting magnet 13 is excited whereby the blade 10 is rotated in clockwise direction. If after cutting the excitation of the magnet 13 is discontinued, the blade 10 returns under the tension of the spring 12 into the position shown in the drawings.

The lower end of the staff of the balance wheel abuts against a glass plate 14. In the embodiment shown in the drawing the staff of the balance 2 is held in position by means of a bar magnet 15 arranged underneath the glass plate 14 and having a pointed end projecting into a recess 16 provided at the lower side of the glass plate 14. The bar magnet is magnetized by means of a coil 17. It might be replaced by a suitable permanent magnet or any other magnet system which has a magnetic field extending above the glass plate 14 and an axis of symmetry coinciding with the axis of the balance suspended in the apparatus.

The bar magnet 15 serves for holding the staff of the balance 2 on the glass plate 14 so that it cannot carry out a vertical vibration in addition to the desired torsional vibrations. The avoidance of this vertical vibration is important in connection with the derivation of an electrical magnitude in dependence on the instantaneous amplitude of the balance vibrations, as more fully described hereinafter.

Furthermore the bar magnet 15 provides for the balance staff to be always suspended absolutely vertically. This fact is of decisive importance for the accuracy of the calibration, because the frequency of the vibrations of the regulating device is greatly influenced by any inclined position of the balance.

Underneath the glass plate 14 a high frequency magnet system is arranged for producing a high frequency rotary field in the range occupied by the balance of the regulating device. This magnet system comprises a magnetic yoke having the shape of a plate 18 consisting of a high-frequency iron and four high-frequency coils 19–22 mounted on the yoke. The coils are arranged opposite each other in pairs such as the coils 19 and 21 on the one hand and the coils 20 and 22 on the other hand so as to cause the formation of a magnetic field which is the resultant of two magnetic fields extending substantially in a first plane and a second plane normally to each other above the glass plate 14 and which are substantially at right angles to the axis of the balance. If one of these magnetic alternating fields is phase-shifted by 90° with respect to the other field, a resultant high frequency rotary field is generated in the range of the balance, which exerts rotary forces on the balance. The control of the high frequency rotary field is carried out (in a way more fully to be described hereinafter) by an electrical magnitude derived from the instantaneous amplitude of the vibrations of the regulating device and more particularly the suspended balance. The vibrations of this wheel are thus gradually increased in amplitude by a driving force derived from the instantaneous amplitude (feed-back oscillator).

Figure 3:
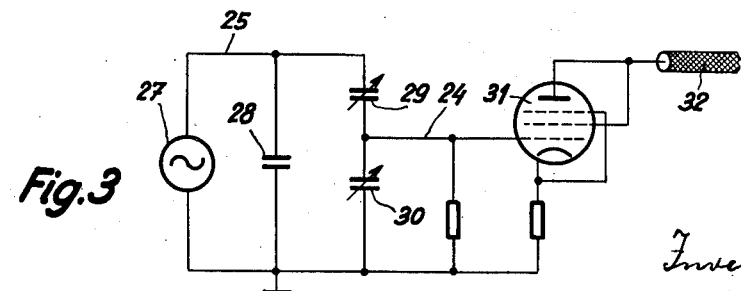
Fig. 3 is an equivalent circuit diagram of the arrangement for deriving an electrical magnitude corresponding to the instantaneous amplitude of the regulating device.

I will now describe with reference to Figs. 1 and 3, how the electrical magnitude derived from the instantaneous amplitude of the balance is obtained. A screened electrical conductor 23 is arranged alongside of the shaft 5 (Fig. 1). It ends inside the hair spring 1, the inner conductor of the screened conductor forming an electrical probe 24 projecting beyond the screen. Furthermore a conductive ring 25 arranged below the glass plate 14 belongs to this exploring system, the ring 25 being under a voltage against ground which is applied by means of a screened conductor 26. In the embodiment here shown an alternating voltage of 1000 cycles per second and 250–300 volts is applied. All other parts of the apparatus which are accessible, including the hair spring, are grounded. Thus an electrical field is generated between the conductor 25 and the hair spring 1 which, however, extends through the hair spring to the probe 24.

Fig. 3 shows the electrical equivalent circuit diagram of this arrangement. The oscillator produces an alternating voltage between ground and the conductor 25. 28 is the capacity of the conductor 25 against ground and 29 the capacity of the conductor 25 against the probe 24, 30 being the capacity of the probe 24 against ground. The probe 24 is connected to the grid of an electron tube 31 which is directly mounted on the calibrating frame. Since the hair spring 1 easily expands and contracts in radial direction during the torsional vibrations of the regulating device, the capacities 29 and 30 are not constant. If the hair spring 1 is contracted, the capacity 29 is relatively small and the capacity 30 relatively large. Therefore the ratio of the voltages produced by the voltage divider formed by the capacities 29 and 30 is small and the voltage of the probe 24 is relatively low. If the hair spring 1 is entirely expanded, these conditions are reversed and the voltage of the probe 24 is relatively high. Thus an amplitude-modulated alternating voltage is applied to the grid of the electron tube 31, which has to be demodulated in order to obtain an electrical magnitude having the same frequency as the frequency of the vibrations of the regulating device. As shown in Fig. 1, the alternating voltage is led from the electron tube 31 by means of a screened conductor 32 to an amplifier and a demodulator. 33 is a grounded connection and 33' is one of the heating leads of the electron tube 31.

I will now explain, with reference to Fig. 2, how the apparatus for driving the balance operates on principle. The oscillator 27 is connected with one terminal to the frame of the calibrating device and with the other terminal to the conductor 25, as was pointed out in detail hereinabove. The weakly modulated alternating voltage applied to the probe 24, having a frequency of 1000 cycles per second, is supplied to a resonance amplifier 34. The amplified voltage is then demodulated in the demodulator 35 and fed to a preliminary filter 36. The voltage (of 2.5 cycles per second) is amplified by a low frequency amplifier 37 and fed to a limiter 38 limiting the positive and negative amplitudes and cutting a trapezoidal alternating voltage out of the sinusoidal voltage. This trapezoidal voltage is alternately amplified and limited by a direct current amplifier 39 which is over-biased so that a uniform rectangular voltage having steeply sloping sides is generated. The direct current amplifier has a push-pull output stage from which the rectangular voltages shifted in phase by 180° are each singly fed to the unilaterally operating differentiators 40 and 40' which supply short negative impulse peaks.

The amplifier and the limiter are so adjusted that the impulse peaks generated by the differentiator 40 coincide as to time with the passing of the balance through zero in one direction, the impulse peaks generated by the differentiator 40' coinciding with the passing of the balance through zero in the opposite direction.

The impulse peak supplied by the differentiator 40' is fed to a time-measuring device 42, in which the period of the vibration of the balance is compared to the period of a calibrating vibration. This time-measuring device supplies the controlling voltages for the servomotor 8 and for the cutting magnet 13. The construction of this time-measuring device has no direct connection with the present invention and need not be discussed more in detail. If the vibration of the balance is too slow, the servomotor 8 is actuated in a direction which causes the hair spring to be shortened by shifting the same between the rollers 3 and 4 (Fig. 1) to the back. If the vibration of the balance is too fast, the servomotor 8 is driven in the opposite direction and the hair spring is lengthened correspondingly. If the frequency of the balance vibrations coincides with the calibrating frequency, the cutting magnet 13 is automatically actuated. At the same time the whole apparatus is put out of operation, until the calibrated regulating device has been removed from it and a new regulating device is inserted.

By means of the impulse peaks supplied by the differentiators unilateral trigger arrangements 43 and 43' are controlled which at each impulse peak generate a short rectangular impulse of adjustable length. During the duration of these rectangular impulses the two modulators 44, 44' and 45, 45' which supply the high frequency currents for the high frequency coils change their manner of operation as more fully described with reference to Fig. 4. Since the rectangular impulses of the trigger arrangement 43 are shifted with respect to the rectangular impulses of the trigger arrangement 43' by half the period of the vibrations of the regulating device which take place at each zero passage of the balance, the modulators or transmitters 44 and 44' change their operation at one zero passage of the balance, the transmitters 45 and 45' at the other zero passage. The modulators 44 and 45' are fed directly by a conventional high frequency oscillator 50. The operating frequency is approximately 100 kilocycles per second. The modulator 44' is fed over a capacitive phase shifter 46, the modulator 45 over an inductive phase shifter 47. The outputs of the modulators 44 and 45' on the one hand and the outputs of the modulators 44' and 45 on the other hand are connected over output transformers 48 and 49 with the coil pairs 19, 21 and 20, 22. Thus, if the modulators 44, 44' change their operations, the coil pair 19, 21 is fed over the transformer 48 with a current being in phase, the coil pair 20, 22 over the transformer 49 with a current being capacitively phase-shifted. In consequence thereof, a high frequency rotary field rotating in one direction is generated, in which the balance receives a mechanical impulse in the direction of rotation of this rotary field. At the next zero passage of the balance the modulator or transmitter 45, 45' changes its operation. The coil pair 19, 21 is again fed with a current in phase over the transformer 48, whereas the coil pair 20, 21 is fed over the transformer 49 with a current which is inductively phase-shifted. In consequence thereof a high frequency rotary field is generated, which rotates in the direction opposite to the direction of the rotary field described hereinabove and supplies to the balance a mechanical impulse in the opposite direction. The duration and intensity of the high frequency impulses can be changed, and, for instance, be so adjusted that the mechanical impulse delivered to the balance at each zero passage is equal to the impulse which it receives in the assembled watch by the escape lever. Therefore the vibration of the regulating device in the calibrating apparatus is the same as under the conditions prevailing in the watch, so that an unobjectionable calibration is accomplshed.

The demodulation of an amplitude-modulated alternating voltage and the transformation of sinusoidal voltages into rectangular impulses is well known in communication current technique. Therefore the parts denoted with 34—39 need not be explained any further. Furthermore, the oscillators 27 and 50 may be any well-known electronic generators which need not satisfy any particular requirements with respect to constancy of frequency or voltage.

Figure 4:
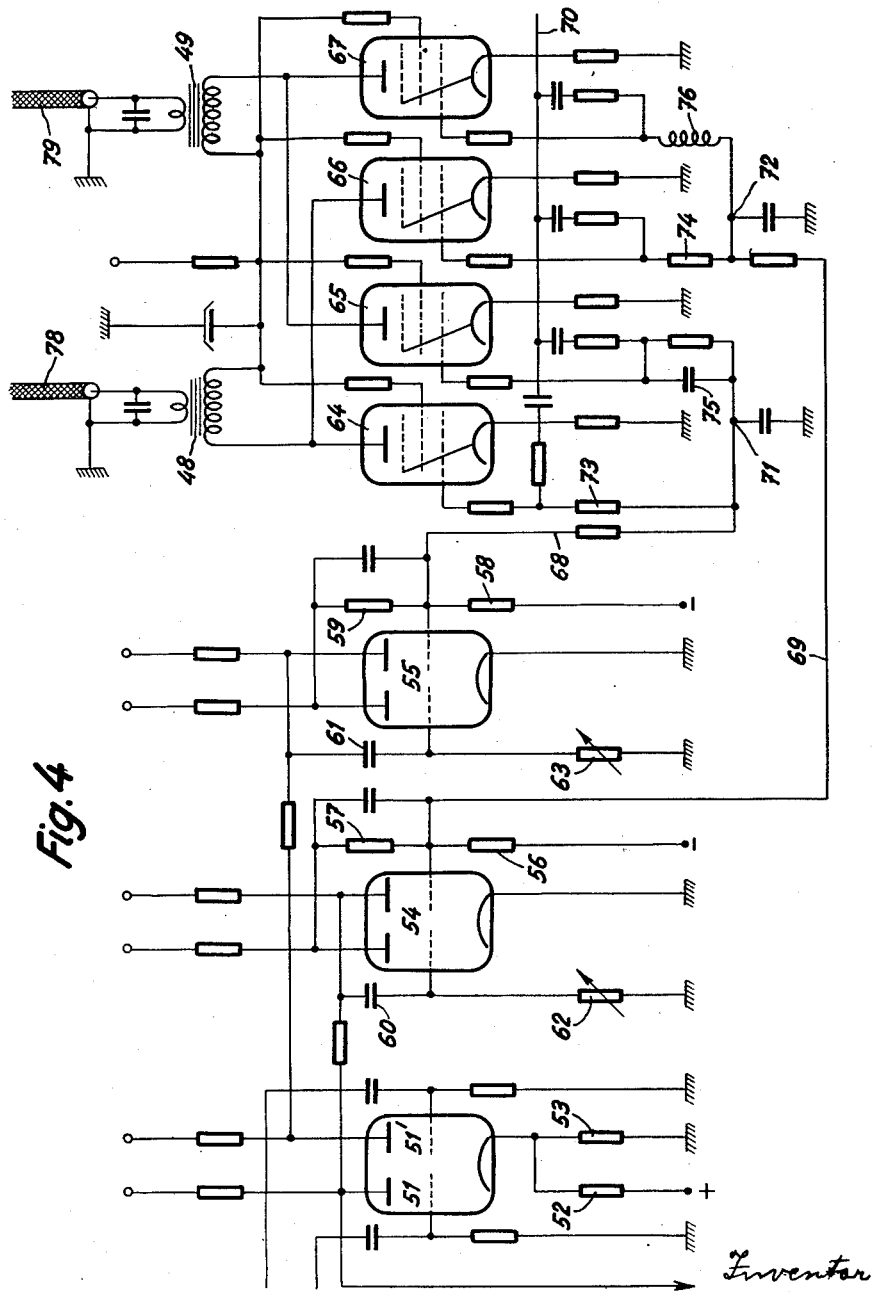
Fig. 4 is a part diagram of the electrical connections by which the driving means acting upon the regulating device are controlled and supplied.

The following description of the structural details will be limited to the differentiators 40 and 40', the unilateral trigger devices 43 and 43', the modulators or transmitters 44, 44', 45 and 45', and the phase shifters 46 and 47. The arrangement corresponding to these parts of the block diagram shown in Fig. 2 is shown in Fig. 4.

The rectangular voltages supplied in push-pull by the strongly biased direct current amplifier 39 are fed to the grids of two triodes 51 and 51' over condensers of 5,000 pf. The grids are each loaded with a resistor of 200 kilo-ohms. This arrangement yields voltage peaks of short duration coinciding as to time with the steep sides of the rectangular curves, the voltage peaks being positive or negative according as the sides of the rectangular curves have positive or negative direction. The common cathode of the triodes 51 and 51' is held at a positive potential against ground by means of a voltage divider consisting of the resistors 52 and 53, so that the triodes are normally non-conductive. If the grids of the triodes 51 and 51' are controlled by the differentiating element so as to become positive, which alternately happens at each passage of the balance through zero, the triodes are rendered conductive and the anode voltage of the conductive triode drops for a short time. These short-voltage impulses are fed to the unilateral trigger arrangements formed by double triodes 54 and 55 over a resistor of 500 kilo-ohms. In normal condition the right-hand sides of the trigger tubes are non-conductive, the left-hand sides conductive. At the instant of decreasing the voltage of the anodes of the tubes 51 and 51' and thus the voltage of the grids of the left-hand triodes of the tubes 54 and 55 which are capacitively connected therewith, the left-hand triodes of the tubes 54 and 55 are rendered non-conductive while the right-hand triodes are rendered conductive, the grid of the right-hand triode which was held at a negative potential over a voltage divider, consisting of resistors 56 and 57 for the tube 54 and of resistors 58 and 59 for the tube 55 becoming positive and the corresponding triode being rendered conductive. The condensers 60 and 61 which control the grids of the left-hand triodes of the trigger arrangements, are charged over the adjustable grid leak resistors 62 and 63, so that the voltage of the grids increases, until the left-hand triodes are rendered conductive again. At this instant the triggers arrangements are tilted again and the grid of the right-hand triode becomes negative, so that the triode is rendered non-conductive. The speed at which the condensers 60 and 61 are charged over the resistors 62 and 63, can be adjusted by adjusting the resistors 62 and 63. Therefore the duration of the trigger action caused by the impulse peaks of the unilateral trigger arrangement can be changed and adjusted to the desired value. To the grids of the right-hand triodes of the tubes are imparted positive, practically rectangular voltage impulses, the width of which is adjustable and which are suitable for controlling the modulators or transmitters 44, 44', 45 and 45'.

These modulators or transmitters are represented by transmitting tubes 64, 65, 66 and 67. Corresponding to the diagram shown in Fig. 2, each two of these tubes are controlled by the same impulse, the tubes 64 and 65 being connected over the conductor 68 to the grid of the right-hand triode of the tube 55, while the tubes 66 and 67 are connected over the conductor 69 to the grid of the right-hand triode of the tube 54. Furthermore, the grids of all tubes 64–67 are connected to voltage dividers. The voltage dividers are connected with one end to a conductor 70, which carries the high frequency alternating voltage produced by the high frequency oscillator 50. The parts of the voltage dividers arranged between the conductor 70 and the grids, consist of condensers of 5,000 pf. and resistors of 200 kilo-ohms. The elements 73, 74, 75 and 76 arranged between the grids and the points 71, 72, which are grounded for high frequency alternating voltages, are relatively low ohmic. The resistor of 200 kilo-ohms of one part of the voltage divider is larger than all the other resistances thereof so that in all voltage dividers currents are flowing which have a phase practically in phase with the high frequency alternating voltage of the conductor 70. Thus, in the mentioned low ohmic element voltage drops are generated which are phase shifted with respect to the oscillator voltage according to the character of these elements. At the tubes 64 and 66 these elements are formed by resistors 73 and 74 so that the grids of these tubes are supplied with a high frequency alternating voltage, which is practically in phase with the voltage of the conductor 70. At the tube 65 the element consists of a condenser 75 of 200 pf. having thus, at a frequency of 100 kilocycles per second, fairly exactly an impedance of 10,000 ohms, and a high ohmic resistor which is of no importance for the phase-shifting. The capacitive voltage drop occurring at this condenser is transferred to the grid of the tube 65, so that the latter supplies a current capacitively phase-shifted with respect to the currents of the tubes 64 and 66. At the tube 67 the element is formed by an inductor 76 having an inductive voltage drop of the same magnitude as the voltage drops of the resistors 73 and 74 and the capacitor 75. Thus, the tube 67 supplies a current inductively phase-shifted with respect to the currents of the tubes 64 and 66. The phase-shifters 46 and 47 in Fig. 2 are represented in Fig. 4 by the voltage dividers with the elements 75 and 76, respectively.

The anodes of the tubes 64 and 66 are supplied with current over the primary of the transformer 48, and the anodes of the tubes 65 and 67 over the primary of the transformer 49. The secondaries of the transformers are connected over the screened cables 78 and 79 with the corresponding coil systems 19, 21 and 20, 22.

If the unilateral trigger arrangement formed by the tube 54 is in triggering condition, the conductor 69, having normally a negative potential against ground, is temporarily brought to ground potential and the tubes 66 and 67, which were blocked by the negative potential, are rendered temporarily conductive. Therefore the coil system 19, 21 receives a high frequency current impulse from the tube 66 over the transformer 48, while the coil system 20, 22 receives over the transformer 49 from the tube 67 a high frequency current impulse, which is inductively phase-shifted with respect to the first-mentioned impulse. Therefore a high frequency rotary field is generated, which rotates in one direction and imparts to the balance an impulse in the same direction of rotation. At the next passage of the balance through zero the tubes 64 and 65 are rendered conductive and the tubes 66 and 67 non-conductive. In consequence thereof the coil system 19, 21 now receives a high frequency current impulse from the tube 64 over the transformer 48, while the coil system 20, 22 receives over the transformer 49 from the tube 65 a high frequency impulse which is capacitively phase-shifted with respect to the first-mentioned current impulse. The high frequency rotary field now rotates in opposite direction and imparts to the balance a driving impulse in the opposite direction.

The undenoted elements in Fig. 4, such as grid resistors, screen grid resistors, cathode resistors, anode resistors, filter resistors and condensers and the like, are well known in such tube connections, so that a detailed discussion thereof does not appear to be necessary.

It should be noted that the filter 36 causes a certain phase shift of the voltage having a frequency of 2.5 cycles per second. By this phase shift the synchronism between the passage of the balance through zero and the occurrence of the impulses of the high frequency rotary field would be upset. This phase shift can be compensated, however, by corresponding phase elements, which are well known in the art and need no further discussion here.

I wish it to be understood that I do not desire to be limited to the details described in the foregoing specification and shown in the drawings, for obvious modifications will occur to a person skilled in the art.

I claim:

1. A device for automatically calibrating the frequency of the vibrations of a regulating device including a staff, a balance mounted on the staff, and a hair spring connected to the balance, comprising, in combination, a flat support of non-magnetic material, means for vertically suspending the regulating device at the free end of the hair spring for oscillation about its longitudinal axis, the lower end of the balance staff abutting against said flat support, and a magnetic system arranged underneath said flat support, said magnetic system being arranged for generating a magnetic field extending at least partly above said flat support and having an axis of symmetry coinciding with the axis of the balance suspended above said flat support.

2. A device for automatically calibrating the frequency of the vibrations of a regulating device including a staff, a balance mounted on the staff, and a hair spring connected to the balance, comprising, in combination, a flat support of non-magnetic material, means for vertically suspending the regulating device at the free end of the hair spring for oscillation about its longitudinal axis, the lower end of the balance staff abutting against said flat support, and a magnetic system arranged underneath said flat support for generating a magnetic field extending at least partly above said flat support, said magnetic system including a bar magnet having a longitudinal axis of symmetry coinciding with the longitudinal axis of the balance staff vertically suspended above said flat support.

3. A device for automatically calibrating the frequency of the vibrations of a regulating device including a staff, a balance mounted on the staff, and a hair spring connected to the balance, comprising in combination a flat support of non-magnetic material having a recess on the lower side thereof, means for vertically suspending the regulating device at the free end of the hair spring for oscillation about its longitudinal axis, the lower end of the balance staff abutting against the upper side of said flat support above said recess, and a magnetic system arranged underneath said flat support for generating a magnetic field extending at least partly above said flat support, said magnetic system including a bar magnet having a longitudinal axis of symmetry coinciding with the axis of the balance staff vertically suspended above said flat support, said bar magnet having a pointed end projecting into the recess of said flat support.

References Cited in the file of this patent

UNITED STATES PATENTS

| | | |
|---|---|---|
| 2,476,761 | Olinger | July 19, 1949 |
| 2,574,395 | Jack et al. | Nov. 6, 1951 |
| 2,613,529 | Katz | Oct. 14, 1952 |